United States Patent
Lee et al.

(10) Patent No.: US 7,920,243 B2
(45) Date of Patent: Apr. 5, 2011

(54) LIQUID CRYSTAL DISPLAY HAVING CELL GAP MAINTAINING MEMBERS LOCATED IN THE SWITCHING ELEMENT REGION AND THE STORAGE LINE REGION

(75) Inventors: Jeong-Ho Lee, Seoul (KR); Kye-Hun Lee, Suwon-si (KR); Kweon-Sam Hong, Seoul (KR); Bae-Heuk Yim, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 261 days.

(21) Appl. No.: 11/181,135

(22) Filed: Jul. 13, 2005

(65) Prior Publication Data

US 2006/0028598 A1    Feb. 9, 2006

(30) Foreign Application Priority Data

Aug. 3, 2004    (KR) ........................ 10-2004-0061078

(51) Int. Cl.
  *G02F 1/1335*    (2006.01)
  *G02F 1/1339*    (2006.01)
(52) U.S. Cl. .................... 349/155; 349/106; 349/157
(58) Field of Classification Search .................. 349/106, 349/155–157, 107
  See application file for complete search history.

(56) References Cited

U.S. PATENT DOCUMENTS

| | | | |
|---|---|---|---|
| 5,680,187 A * | 10/1997 | Nagayama et al. | 349/110 |
| 5,850,271 A * | 12/1998 | Kim et al. | 349/111 |
| 6,493,050 B1 * | 12/2002 | Lien et al. | 349/106 |
| 6,671,025 B1 * | 12/2003 | Ikeda et al. | 349/156 |
| 6,686,982 B1 * | 2/2004 | Yoshii | 349/113 |
| 7,139,061 B2 * | 11/2006 | Ikeda et al. | 349/156 |
| 7,227,606 B2 * | 6/2007 | Takeda et al. | 349/139 |
| 2001/0040656 A1 * | 11/2001 | Na et al. | 349/110 |
| 2002/0080320 A1 * | 6/2002 | Suzuki et al. | 349/153 |
| 2003/0048403 A1 * | 3/2003 | Satoh | 349/156 |
| 2003/0156236 A1 * | 8/2003 | Yamada | 349/106 |
| 2004/0201799 A1 * | 10/2004 | Nakayoshi et al. | 349/106 |
| 2005/0140892 A1 * | 6/2005 | Kim et al. | 349/139 |
| 2005/0190338 A1 * | 9/2005 | Lim | 349/156 |
| 2005/0270445 A1 * | 12/2005 | Lee et al. | 349/108 |

* cited by examiner

*Primary Examiner* — David Nelms
*Assistant Examiner* — Jessica M Merlin
(74) *Attorney, Agent, or Firm* — Innovation Counsel LLP

(57) ABSTRACT

A color filter substrate includes a transparent substrate, a light-blocking layer, a color filter layer, a first cell gap maintaining member and a second cell gap maintaining member. The transparent substrate has a plurality of pixel regions. Each of the pixel regions includes first and second regions. The light-blocking layer is disposed over the transparent substrate. The light-blocking layer blocks light that leaks through boundaries of the pixel regions. The color filter layer is disposed over the transparent substrate. The color filter layer has a first thickness at the first region and a second thickness that is smaller than the first thickness at the second region. The first cell gap maintaining member is disposed at the first region. The second cell gap maintaining member is disposed at the second region. Therefore, a height difference between the main column spacer and the sub column spacer may be easily adjusted.

12 Claims, 9 Drawing Sheets

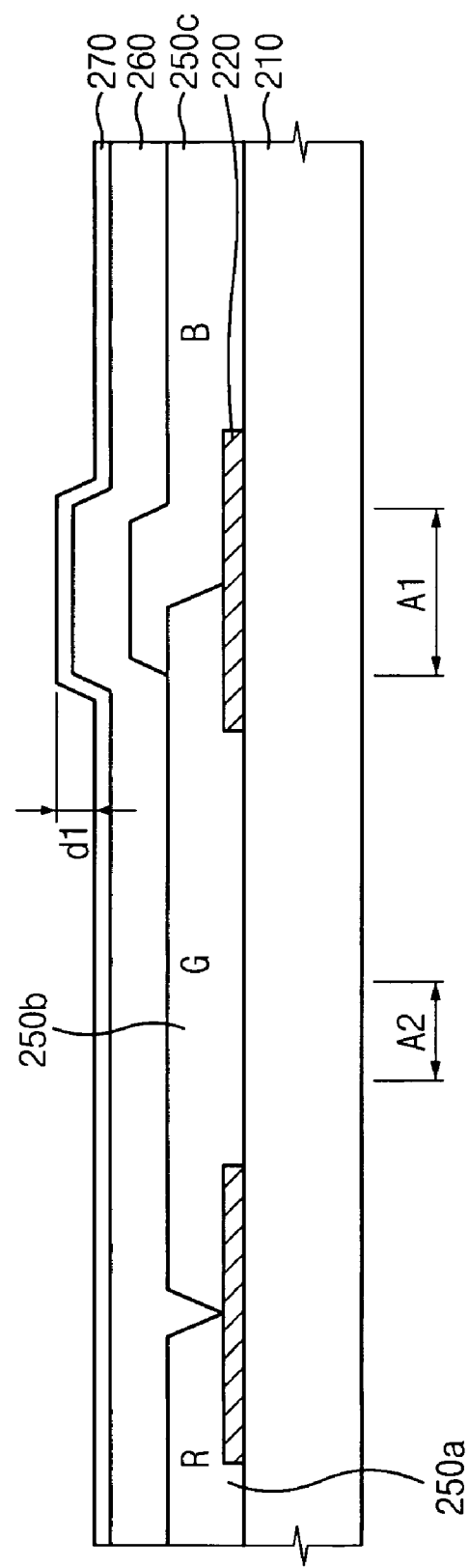

LIQUID CRYSTAL DISPLAY HAVING CELL GAP MAINTAINING MEMBERS LOCATED IN THE SWITCHING ELEMENT REGION AND THE STORAGE LINE REGION

CROSS-REFERENCE TO RELATED APPLICATIONS

This application relies for priority upon Korean Patent Application No. 2004-61078 filed on Aug. 3, 2004, the contents of which are incorporated by reference herein in its entirety.

BACKGROUND

1. Field of the Invention

The present invention relates to a color filter panel, a display panel having the color filter panel, and a method of manufacturing the color filter panel. More particularly, the present invention relates to a color filter panel for enhancing the uniformity of distribution of liquid crystal and uniformly maintaining the cell gap between the color filter substrate and the TFT substrate that is to be combined with the color filter substrate uniformly.

2. Description of the Related Art

A liquid crystal display (LCD) device includes an LCD panel having a TFT substrate, a color filter substrate facing the TFT substrate, and a liquid crystal layer disposed between the TFT substrate and the color filter substrate. When an electric field is applied to the liquid crystal layer, an arrangement of liquid crystal molecules of the liquid crystal layer is altered to change the optical transmissivity of the liquid crystal layer. The liquid crystal layer does not emit light by itself but only adjusts the optical transmissivity, so that in order to display an image, the LCD device utilizes a lamp that provides the LCD panel with light.

The liquid crystal layer is disposed between the TFT substrate and the color filter substrate. The TFT substrate and the color filter substrate are spaced apart by a column spacer disposed between the TFT substrate and the color filter substrate. The column spacer maintains a cell gap between the TFT substrate and the color filter substrate.

The liquid crystal layer is formed by a dropping method. In detail, liquid crystal is dropped onto the color filter substrate. The TFT substrate is disposed on the color filter substrate, and then the color filter substrate and the TFT substrate are compressed in order to distribute the liquid crystal throughout a space disposed between the color filter substrate and the TFT substrate. Then, a seal line surrounding the edges of the TFT substrate and the color filter substrate, and disposed between the TFT substrate and the color filter substrate is hardened to combine the TFT substrate and the color filter substrate.

When forming the liquid crystal layer between the color filter substrate and the TFT substrate, the column spacer may cause non-uniform distribution between the color filter substrate and the TFT substrate. In detail, when a number of column space is too large, the color filter layer and the TFT substrate are not compressed toward each other, so that the liquid crystal is not uniformly distributed. On the contrary, when a number of the color filter substrate is too small, a cell gap between the color filter substrate and the TFT substrate is not maintained.

In order to solve above-mentioned problems, a main column spacer and a sub column spacer having different height for enhancing uniform distribution of liquid crystal and maintaining the cell gap between the TFT substrate and the color filter substrate have been introduced. In detail, the main column spacer is longer than the sub column spacer, so that the main column spacer formed at the color filter substrate makes contact with the TFT substrate but the sub column spacer formed at the color filter substrate is spaced apart from the TFT substrate. Therefore, the color filter substrate and the TFT substrate may be easily compressed toward each other when forming the liquid crystal layer. Additionally, the sub column spacer prevents an excessive compression to maintain the cell gap.

When the main column spacer and the sub column spacer have a specific height difference, uniformity of liquid crystal distributed on the color filter substrate is enhanced and the cell gap between the TFT substrate and the color filter substrate is maintained effectively. However, forming the main and sub column spacers having the specific height difference between the main column spacer and the sub column spacer is difficult.

SUMMARY

In accordance with the present invention, a color filter panel for enhancing uniformity of distribution of liquid crystal and uniformly maintaining the cell gap between the color filter substrate and the TFT substrate is provided.

A display panel having the above-mentioned color filter substrate is also provided.

A method of manufacturing a color filter substrate is also provided.

A method of manufacturing a display panel is also provided.

In an exemplary color filter substrate according to the present invention, the color filter substrate includes a transparent substrate, a light-blocking layer, a color filter layer, a first cell gap maintaining member, and a second cell gap maintaining member. The transparent substrate has a plurality of pixel regions. Each of the pixel regions includes a first region and a second region. The light-blocking layer is disposed over the transparent substrate. The light-blocking layer blocks light that leaks through boundaries of the pixel regions. The color filter layer is disposed over the transparent substrate and the light-blocking layer. The color filter layer has a first thickness at the first region and a second thickness that is smaller than the first thickness at the second region. The first cell gap maintaining member is disposed at the first region. The second cell gap maintaining member is disposed at the second region.

In an exemplary display device according to the present invention, the display device includes a first substrate, a second substrate, a first cell gap maintaining member, and a second cell gap maintaining member. The first substrate has a plurality of pixel regions. Each of the pixel regions has a first region and a second region. The second substrate includes a color filter layer having a first thickness at a third region corresponding to the first region of the first substrate, and a second thickness that is smaller than the first thickness at a fourth region corresponding to the second region of the first substrate. The first cell gap maintaining member is disposed between the lower and second substrates at the first region of the first substrate and the third region of the second substrate. The second cell gap maintaining member is disposed between the lower and second substrates at the second region of the first substrate and the fourth region of the second substrate.

In an exemplary method of manufacturing a color filter substrate according to the present invention, a light-blocking layer is formed on a transparent substrate having a plurality of pixel regions. The light-blocking layer blocks light that leaks through boundaries of the pixel regions. A color filter layer is formed over the transparent substrate such that the color filter layer has a first thickness at the first region and a second thickness that is smaller than the first thickness at the second region. A first cell gap maintaining member is formed at the first region. A second cell gap maintaining member is formed at the second region.

In an exemplary method of manufacturing a display device according to the present invention, a first substrate having a plurality of pixel regions is formed. Each of the pixel regions has a first region and a second region. A second substrate including a color filter layer having a first thickness at a third region corresponding to the first region of the first substrate, and a second thickness that is smaller than the first thickness at a fourth region corresponding to the second region of the first substrate is formed. A first cell gap maintaining member is formed at the third region. A second cell gap maintaining member is formed at the fourth region. The lower and second substrates are assembled such that the first and second regions of the first substrate face the third and fourth regions of the second substrate, respectively.

According to the present invention, a height difference between the main column spacer and the sub column spacer is adjusted by the color filter layer, so that the uniformity of distribution of liquid crystal is enhanced and the cell gap between the color filter substrate and the TFT substrate is uniformly maintained.

BRIEF DESCRIPTION OF THE DRAWINGS

The above and other features and advantages of the present invention will become more apparent by describing in detailed exemplary embodiments thereof with reference to the accompanying drawings, in which:

FIGS. 4A through 4D are cross-sectional views illustrating steps of manufacturing the color filter substrate in FIG. 1;

DESCRIPTION OF EMBODIMENTS

It should be understood that the exemplary embodiments of the present invention described below may be modified in many different ways without departing from the inventive principles disclosed herein, and the scope of the present invention is therefore not limited to these particular embodiments. Rather, these embodiments are provided so that this disclosure will be thorough and complete, and will fully convey the concept of the invention to those skilled in the art by way of example and not of limitation.

Hereinafter, the embodiments of the present invention will be described in detail with reference to the accompanied drawings.

Figure 1:
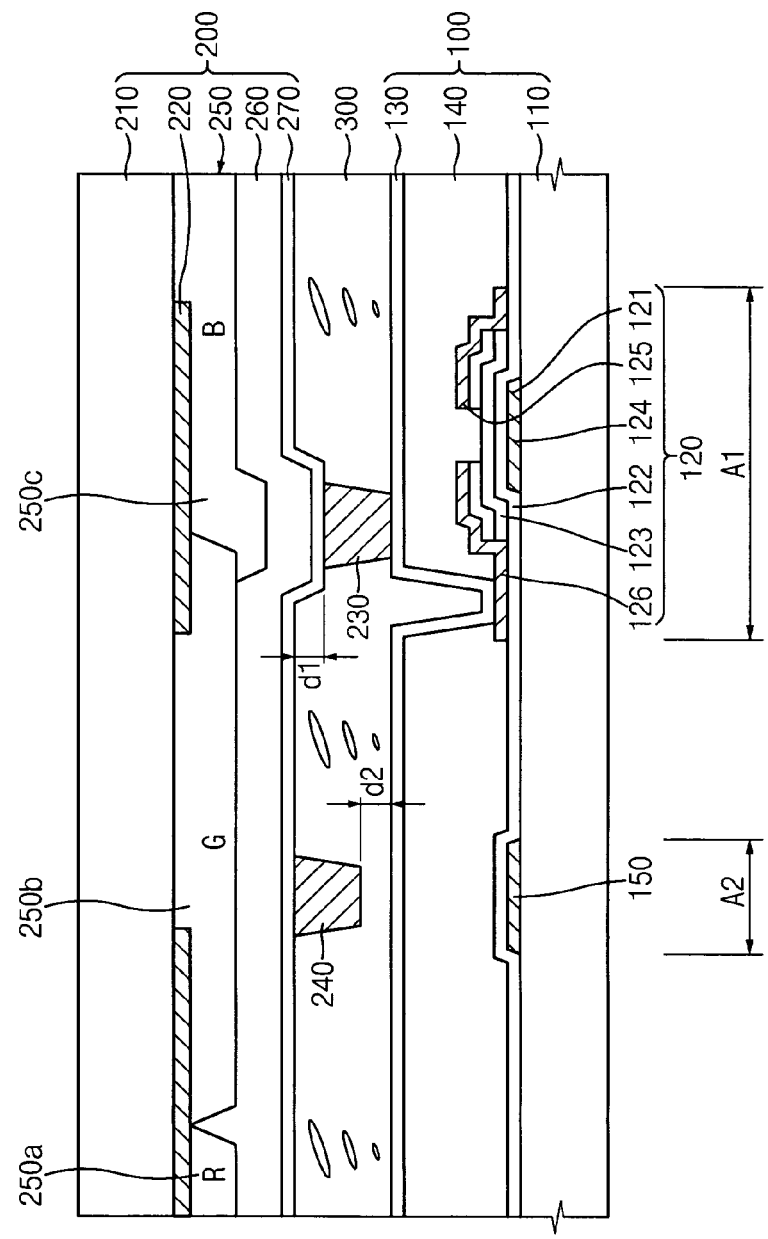
FIG. 1 is a cross-sectional view illustrating a liquid crystal display panel according to an exemplary embodiment of the present invention.
Figure 2:
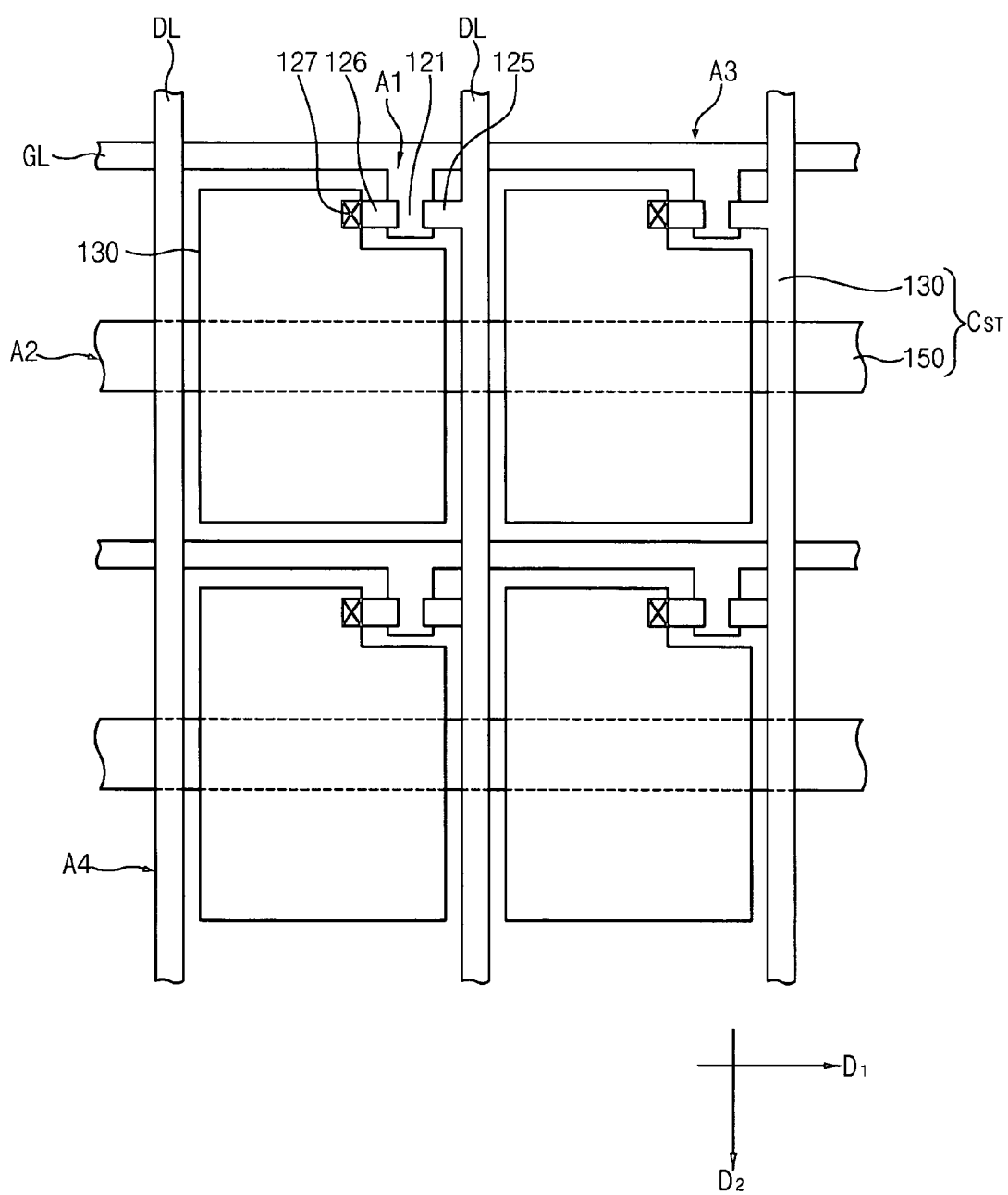
FIG. 2 is a layout illustrating a portion of a TFT substrate in FIG. 1.

FIG. 1 is a cross-sectional view illustrating a liquid crystal display panel according to an exemplary embodiment of the present invention. FIG. 2 is a layout illustrating a portion of a TFT substrate in FIG. 1, and FIG. 3 is a layout illustrating a portion of a color filter substrate in FIG. 1.

Figure 3:
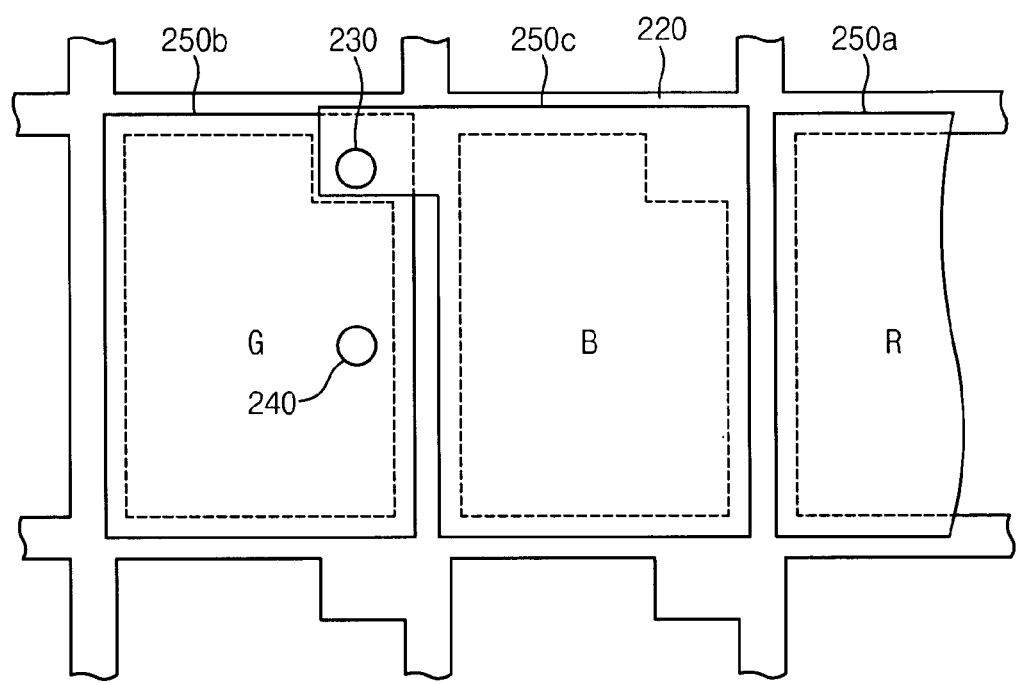
FIG. 3 is a layout illustrating a portion of a color filter substrate in FIG. 1.

Referring to FIGS. 1 through 3, a liquid crystal display (LCD) panel according to the present embodiment includes a TFT substrate 100, a color filter substrate 200 and a liquid crystal layer 300 disposed between the TFT substrate 100 and the color filter substrate 200.

The TFT substrate 100 includes a first substrate 110 and a plurality of pixels arranged in a matrix on the first substrate 110. Each of the pixels includes a gate line GL extending in a first direction D1, a data line DL extending in a second direction D2 that is substantially perpendicular to the first direction D1, a thin film transistor (TFT) 120 electrically connected to the data line DL and the gate line GL, and a pixel electrode 130 that is electrically connected to the TFT 120.

The TFT 120 includes a gate electrode 121, a source electrode 125 and a drain electrode 126. The gate electrode 121 protrudes from the gate line GL. A gate insulation layer 122 is formed on the first substrate 110 having the gate line GL and the gate electrode 121 formed thereon. An active layer 123 is formed on the gate insulation layer 122, and an ohmic contact layer 124 is formed on the active layer 123.

The data line DL is formed on the gate insulation layer 122. The source electrode 125 protrudes from the data line DL. The drain electrode 126 is spaced apart from the source electrode 125. The source electrode 125 and the drain electrode 126 are disposed on the ohmic contact layer 124. Therefore, the TFT 120 is completed.

An insulation layer 140 is formed on the first substrate 110 having the TFT 120 formed thereon. The insulation layer 140 includes a contact hole 127. The contact hole 127 exposes a portion of the drain electrode 126. The pixel electrode 130 is formed on the insulation layer 140. The pixel electrode 130 is electrically connected to the drain electrode 126 through the contact hole 127. The pixel electrode 130 includes an optically transparent and electrically conductive material such as indium tin oxide (ITO), indium zinc oxide (IZO), etc.

A storage line 150 passes through a center portion of pixels. The storage line 150 extends such that the storage line 150 is substantially parallel to the gate line GL. The pixel electrode 130 and the storage line 150 define a storage capacitor Cst for maintaining a pixel voltage applied to the pixel electrode 130 for a predetermined time. In other words, the pixel electrode 130 corresponds to an upper electrode of the storage capacitor Cst, and the storage line 150 corresponds to a lower electrode of the storage capacitor Cst.

The TFT substrate 100 includes an effective display region for displaying an image, and a non-effective display region that is adjacent to the effective display region. The non-effective display region includes a first region A1, a second region A2, a third region A3 and a fourth region A4. The TFT 120 is disposed at the first region A1. The storage line 150 is disposed at the second region A2. The gate line GL is disposed at the third region A3. The data line DL is disposed at the fourth region A4.

Hereinafter, the first, second, third and fourth regions A1, A2, A3 and A4 extend to the color filter substrate 200. In detail, regions of the color filter substrate 200 disposed over the first, second, third and fourth regions A1, A2, A3 and A4 of the TFT substrate 100 are referred to as the first, second, third and fourth regions A1, A2, A3 and A4, respectively. The color filter substrate 200 includes a second substrate 210, a light-blocking layer 220, a first cell gap maintaining member 230, a second cell gap maintaining member 240, a color filter layer 250, a over-coating layer 260, and a common electrode 270.

The light-blocking layer 220 is disposed at the first, second, third and fourth regions A1, A2, A3 and A4 of the TFT substrate 100. The light-blocking layer 220 includes a non-organic material, for example, chromium (Cr). Therefore, the light-blocking layer 220 may be formed to have with a minimal thickness. When a light-blocking layer including organic material is provided as a thin layer, light may pass through the light-blocking layer. Therefore, a light-blocking layer including an organic material is applied with an increased thickness relative to the light-blocking layer including a non-organic material in order to effectively block light. The light-blocking layer 220 including chromium (Cr) has a thickness of about 0.2 µm.

The light-blocking layer 220 covering the first region A1, and the third and fourth regions A3 and A4 blocks light to prevent the light from leaking through the pixel regions, and prevents the TFT 120, the gate line GL, and the data line DL from being reflected through LCD panel.

The color filter layer 250 includes a red color filter (R-color filter) 250a, a green color filter (G-color filter) 250b, and a blue color filter (B-color filter) 250c. The light-blocking layer 220 is disposed at the transitions between the R-color filter 250a, the G-color filter 250b and the B-color filter 250c. In other words, the R-color filter 250a, the G-color filter 250b and the B-color filter 250c are compartmentalized by the light-blocking layer 220.

According to the present embodiment, the R-color filter 250a, the G-color filter 250b, and the B-color filter 250c overlap with each other at boundary regions between the R-color filter 250a, the G-color filter 250b, and the B-color filter 250c.

The R-color filter 250a, the G-color filter 250b, and the B-color filter 250c of the color filter layer 250 overlap with each other at the first region A1 of the TFT substrate 100, so that the color filter layer 250 of the first region A1 is thicker than the color filter layer 250 of other regions. For example, the G-color filter 250b and the B-color filter 250c overlap with each other at the first region A1, so that a thickness of the color filter layer 250 of the first region A1 is thicker than a thickness of other regions to induce a height difference d1 between the first region A1 and other regions.

The over-coating layer 260 is formed on the color filter layer 250. The over-coating layer 260 has a substantially uniform thickness, so that the height difference d1 between the first region A1 and other regions is maintained, even when the over-coating layer 260 is formed.

The common electrode 270 is formed on the over-coating layer 260. The common electrode 270 includes an optically transparent and electrically conductive material such as indium tin oxide (ITO), indium zinc oxide (IZO), etc. The common electrode 270 has a uniform thickness, so that the height difference d1 between the first region A1 and other regions is maintained, even when the common electrode 270 is formed.

The first and second cell gap maintaining members 230 and 240 are formed on the common electrode 270. The first and second cell gap maintaining members 230 and 240 are disposed over the non-effective display region. In detail, the first cell gap maintaining member 230 is disposed at the first region A1 where the TFT 120 of the TFT substrate 110 is formed, and the second cell gap maintaining member 240 is disposed over the second region A2 where the storage line 150 of the TFT substrate 110 is formed, so that the first cell gap maintaining member 230 is disposed over the TFT 120, and the second cell gap maintaining member 240 is disposed over the storage line 150.

Each of the first and second cell gap maintaining members 230 and 240 has a truncated cone shape. In other words, each of the first and second cell gap maintaining members 230 and 240 has a cylindrical shape having a gradually decreasing diameter. Hereinafter, the first and second cell gap maintaining members 230 and 240 are referred to as first and second column spacers 230 and 240, respectively.

The first column spacer 230 corresponds to a main column spacer that maintains a cell gap between the TFT substrate 100 and the color filter substrate 200, and the second column spacer 240 corresponds to sub column spacer that maintains at least a minimum cell gap distance between the TFT substrate 100 and the color filter substrate 200, even when the one of the TFT substrate 100 and the color filter substrate 200 is compressed. Without the second column spacer 240, when one of the TFT substrate 100 and the color filter substrate 200 is compressed, the TFT substrate 100 and the color filter substrate 200 make contact with each other. This can lower the distribution uniformity of liquid crystal. The first and second column spacers 230 and 240 have substantially the same height, and the first column spacer 230 is disposed at the first region A1, and the second column spacer 240 is disposed, for example, at the second region A2, so that the height difference d1 is maintained. In other words, when the color filter substrate 200 is combined with the TFT substrate 100, the first column spacer 230 makes contact with the TFT substrate 100 to maintain the cell gap and the second column spacer 240 is spaced apart from the TFT substrate 100 by a second distance d2 that is substantially the same as the height difference d1.

Hereinafter, a method of manufacturing the color filter substrate 200 will be explained in more detail.

FIGS. 4A through 4D are cross-sectional views illustrating steps of manufacturing the color filter substrate in FIG. 1.

Figure 4A:
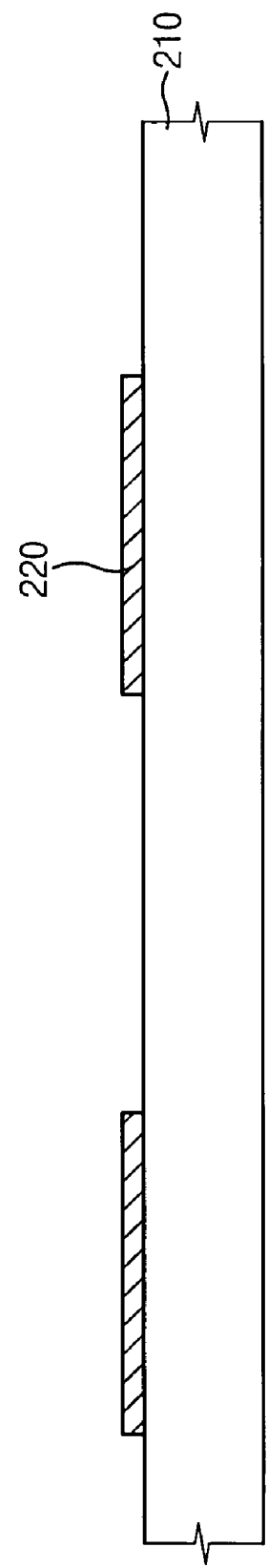

Referring to FIG. 4A, a metal layer including, for example, chromium is formed on the second substrate 210, and the metal layer is patterned to form the light-blocking layer 220. The light-blocking layer 220 includes a non-organic material, for example, chromium (Cr). Therefore, the light-blocking layer 220 may be formed with a minimal thickness. The light-blocking layer 220 including chromium (Cr) has a thickness of about 0.2 µm.

Figure 4B:
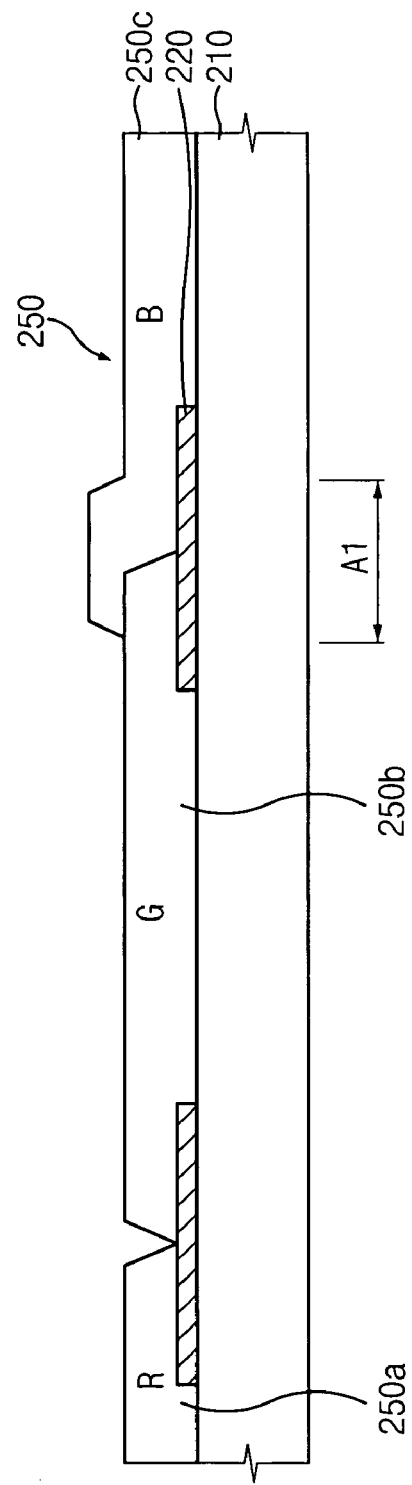

Referring to FIG. 4B, a first photoresist layer (not shown) including a red colored pigment or a red colored dye is formed on the second substrate 210, and then the first photoresist layer is patterned to form the R-color filter 250a.

A second photoresist layer (not shown) including a green colored pigment or a green colored dye is formed on the second substrate 210 having the R-color filter 250a formed thereon, and then the second photoresist layer is patterned to form the G-color filter 250b.

A third photoresist layer (not shown) including a blue colored pigment or a blue colored dye is formed on the second substrate 210 having the R-color filter 250a and the G-color filter 250b formed thereon, and then the third photoresist layer is patterned to form the B-color filter 250c. Therefore, the color filter layer 250 including the R-color filter 250a, the G-color filter 250b and the B-color filter 250c is completed.

A portion of the B-color filter 250c overlaps with a portion of the G-color filter 250b at the first region A1 where the first column spacer 230 is to be formed, so that a height of the first region A1 is higher than other regions with respect to the second substrate 210.

Referring to FIG. 4C, an over-coating layer 260 including an organic material, for example, acryl resin, polyamide resin, etc., is formed on the second substrate 210 having the color filter layer 250 formed thereon. The over-coating layer 260 has a substantially uniform thickness. Then, the common electrode 270 including an optically transparent and electrically conductive material such as indium tin oxide (ITO), indium zinc oxide (IZO), etc., is formed on the over-coating layer 260. The common electrode 270 corresponds to a counter electrode of the pixel electrode. The common electrode 270 has a uniform thickness. Therefore, the first region A1 is taller than other regions. In other words, a height difference d1 is generated between the first region A1 and other regions due to overlapping of the G-color filter 250b and the B-color filter 250c.

Figure 4D:
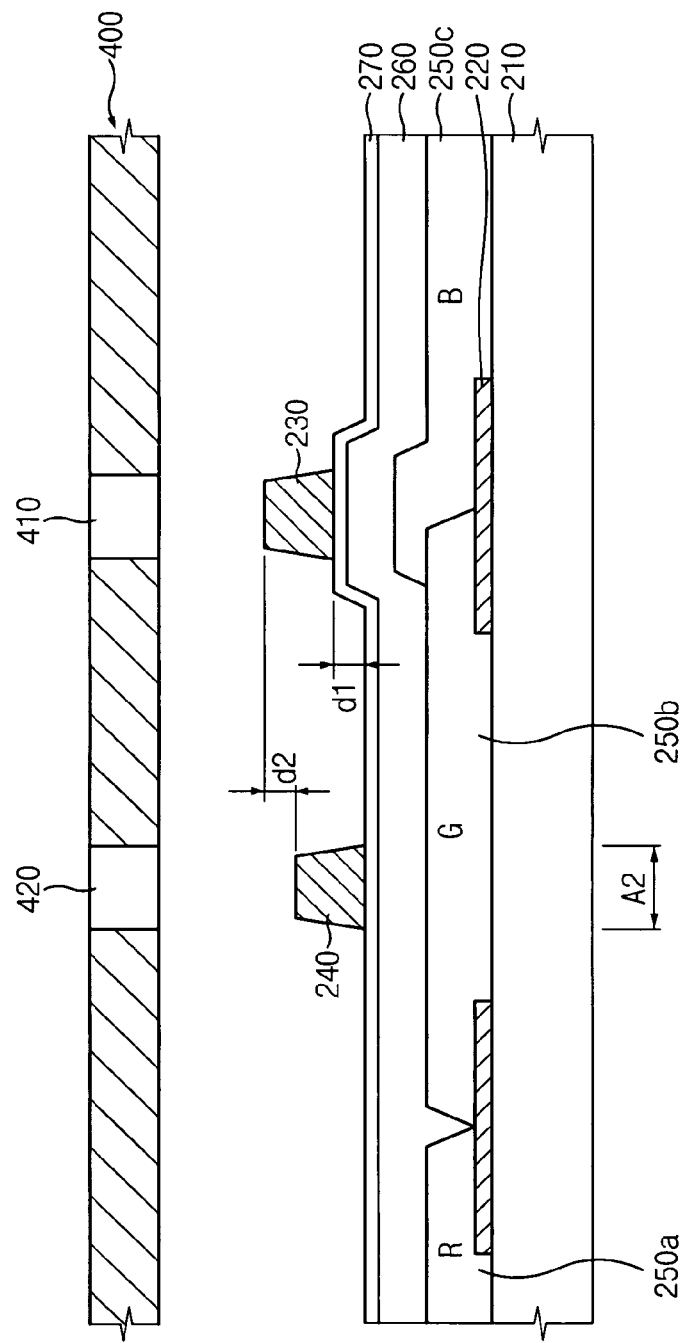

Referring to FIG. 4D, an organic layer (not shown) is formed on the common electrode 270. The organic layer has a roughly uniform thickness. The organic layer corresponds, for example, to a negative photoresist. Alternatively, the organic layer may correspond to a positive photoresist.

A mask 400 is disposed over the organic layer. The mask 400 has a first opening portion 410 and a second opening portion 420 corresponding to the first and second column spacers 230 and 240, respectively. Then, the organic layer is exposed and developed, so that the organic layer is patterned to form the first and second column spacers 230 and 240. The height of the first and second column spacers 230 and 240 may be adjusted by altering the thickness of the organic layer, and the width of the first and second column spacers 230 and 240 may be adjusted by altering the size of the first and second openings 410 and 420.

Figure 5:
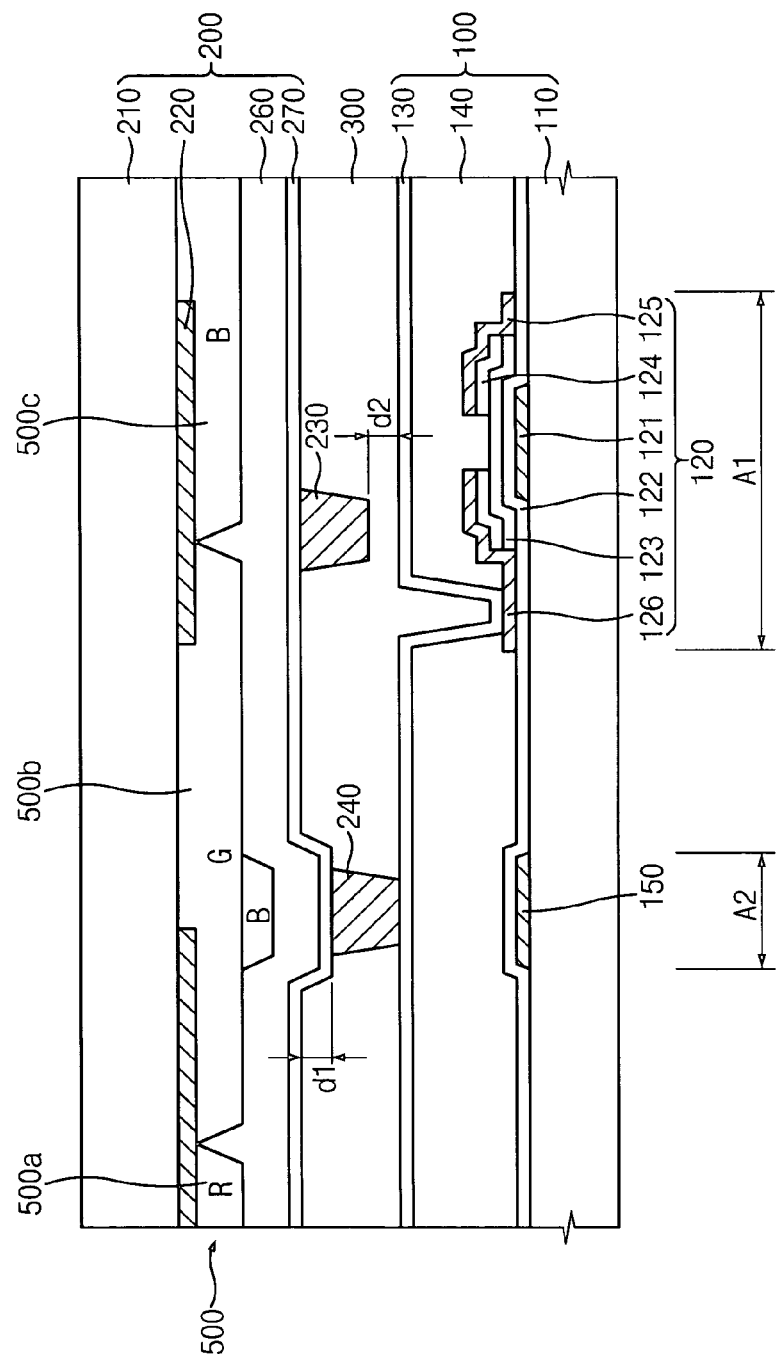
FIG. 5 is a cross-sectional view illustrating a liquid crystal display device according to another exemplary embodiment of the present invention.
Figure 6:
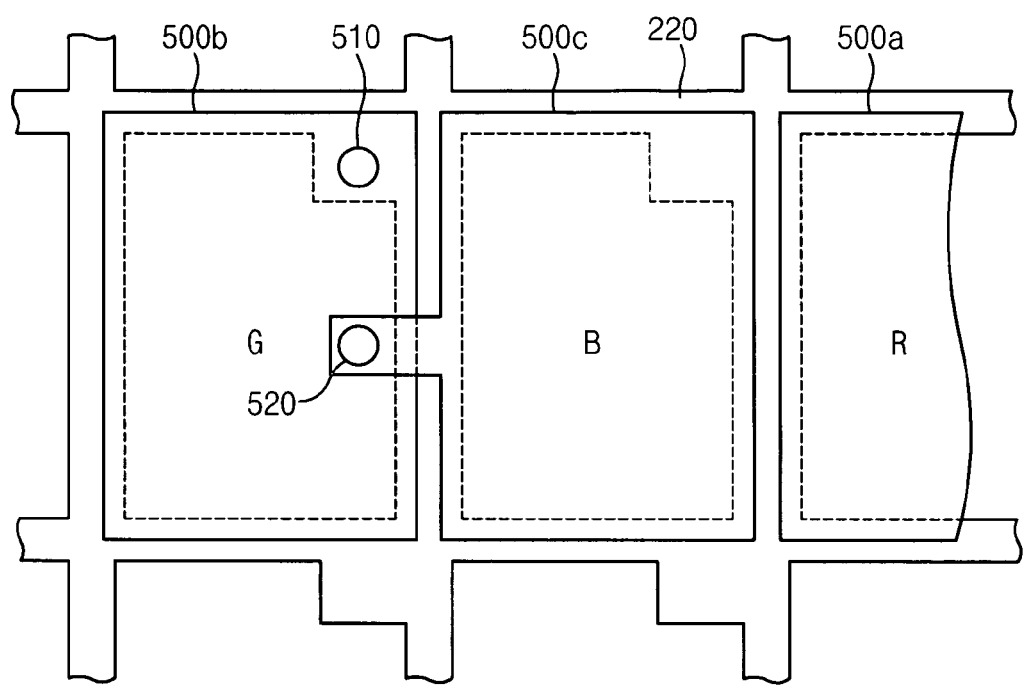
FIG. 6 is a layout illustrating a portion of the color filter substrate in FIG. 5.

The first column spacer 230 is formed in the first region A1, and the second column spacer 240 is formed, for example, in the second region A2 that is lower than the first region A1 by the first height difference d1, so that the first column spacer 230 is higher than the second column spacer 240 by the second difference d2 that is substantially equal to the first height difference d1 even though the first and second spacers 230 and 240 have same height. When slits (not shown) or translucent regions (not shown) surrounding the first and second openings 410 and 420 are formed at the mask 400, the first and second spacers 230 and 240 having the conical shape are formed. FIG. 5 is a cross-sectional view illustrating a liquid crystal display device according to another exemplary embodiment of the present invention, and FIG. 6 is a layout illustrating a portion of the color filter substrate in FIG. 5. The same reference numerals will be used to refer to the same or like parts as those described above.

Referring to FIGS. 5 and 6, a liquid crystal display (LCD) device according to the present invention includes a TFT substrate 100, a color filter substrate 200, and a liquid crystal layer 300 disposed between the TFT substrate 100 and the color filter substrate 200.

The TFT substrate 100 includes an effective display region for displaying an image and a non-effective display region that is adjacent to the effective display region. The non-effective display region includes a first region A1 where the TFT 120 is formed, and a second region A2 where the storage line 150 is formed. The non-effective display region further includes regions where the gate line GL and the data line DL are formed.

The color filter substrate 200 includes a second substrate 210, a light-blocking layer 220, a first cell gap maintaining member 230, a second cell gap maintaining member 240, a color filter layer 500, an over-coating layer 260, and a common electrode 270.

The light-blocking layer 220 is disposed at the first and second regions A1 and A2. The light-blocking layer 220 includes a non-organic material, for example, chromium (Cr). Therefore, the light-blocking layer 220 may be formed to with a minimal thickness. The light-blocking layer 220 including chromium (Cr) has a thickness of about 0.2 μm.

The color filter layer 500 includes a red color filter (R-color filter) 500a, a green color filter (G-color filter) 500b, and a blue color filter (B-color filter) 500c. The light-blocking layer 220 is disposed at the transitions between the R-color filter 500a, the G-color filter 500b and the B-color filter 500c. In other words, the R-color filter 500a, the G-color filter 500b and the B-color filter 500c are compartmentalized by the light-blocking layer 220.

According to the present embodiment, the R-color filter 500a, the G-color filter 500b and the B-color filter 500c do not overlap with each other at a boundary region between the R-color filter 500a, the G-color filter 500b, and the B-color filter 500c. Instead, the R-color filter 500a, the G-color filter 500b and the B-color filter 500c overlap at a center region of one of the R-color filter 500a, the G-color filter 500b, and the B-color filter 500c.

The R-color filter 500a, the G-color filter 500b, and the B-color filter 500c of the color filter layer 500 overlap with each other at the second region A2 of the TFT substrate 100, so that the color filter layer 500 of the first region A2 is thicker than the color filter layer 500 of other regions.

For example, the G-color filter 500b and the B-color filter 500c overlap with each other at the second region A2, so that a thickness of the color filter layer 500 of the second region A2 is thicker than a thickness of other regions to induce a height difference d1 between the second region A2 and other regions.

The over-coating layer 260 is formed on the color filter layer 500. The over-coating layer 260 has a substantially uniform thickness, so that the height difference d1 between the second region A2 and other regions is maintained, even when the over-coating layer 260 is formed.

The common electrode 270 is formed on the over-coating layer 260. The common electrode 270 includes an optically transparent and electrically conductive material such as indium tin oxide (ITO), indium zinc oxide (IZO), etc. The common electrode 270 has a uniform thickness, so that the height difference d1 between the second region A2 and other regions is maintained, even when the common electrode 270 is formed.

The first and second cell gap maintaining members 230 and 240 are formed on the common electrode 270. The first and second cell gap maintaining members 230 and 240 are disposed over the non-effective display region. In detail, the first cell gap maintaining member 230 is disposed at the first region A1 where the TFT 120 of the TFT substrate 110 is formed, and the second cell gap maintaining member 240 is disposed over the second region A2 where the storage line 150 of the TFT substrate 110 is formed, so that the first cell gap maintaining member 230 is disposed over the TFT 120, and the second cell gap maintaining member 240 is disposed over the storage line 150.

Each of the first and second cell gap maintaining members 230 and 240 has a truncated cone shape. In other words, each of the first and second cell gap maintaining members 230 and 240 has a cylindrical shape having a gradually decreasing diameter. Hereinafter, the first and second cell gap maintaining members 230 and 240 are referred to as first and second column spacers 230 and 240, respectively.

The second column spacer 240 corresponds to a main column spacer that maintains a cell gap between the TFT substrate 100 and the color filter substrate 200, and the first column spacer 230 corresponds to sub column spacer that maintains at least a minimum cell gap distance between the TFT substrate 100 and the color filter substrate 200, even when the one of the TFT substrate 100 and the color filter substrate 200 is compressed. Without the first column spacer 230, when one of the TFT substrate 100 and the color filter substrate 200 is compressed, the TFT substrate 100 and the color filter substrate 200 make contact with each other. This can lower the distribution uniformity of liquid crystal.

The first and second column spacers 230 and 240 have substantially the same height, and the first column spacer 230 is disposed at the first region A1, and the second column spacer 240 is disposed at the second region A2, so that the height difference d1 is maintained. In other words, when the color filter substrate 200 is combined with the TFT substrate 100, the second column spacer 240 makes contact with the TFT substrate 100 to maintain the cell gap, and the first column spacer 230 is spaced apart from the TFT substrate 100 by a second distance d2 that is substantially the same as the height difference d1.

According to one aspect the present disclosure, a height difference between the main column spacer and the sub column spacer is adjusted by overlapping the color filters, so that uniformity of distribution of liquid crystal is enhanced and the cell gap between the color filter substrate and the TFT substrate is maintained uniformly.

Having described exemplary embodiments in accordance with the present disclosure and advantages thereof, it is noted that various changes, substitutions and alterations can be made thereto in view of the disclosure and without departing from the spirit and scope of the present teachings.

What is claimed is:

1. A display panel comprising:
a first substrate having a plurality of pixel regions in which a pixel electrode is formed, the first substrate including a switching device formed at a first region and a storage line formed at a second region, the storage line corresponding to a first electrode of a capacitor for maintaining a pixel voltage for a predetermined time;
a second substrate including a color filter layer having a plurality of color filters each operable to provide color filtration, wherein lateral boundaries of two adjacent ones of continuous and operable color filters overlap at the first region so that a thickness of the color filter layer at the first region due to the overlapping color filters is thicker than that at the second region;
a first cell gap maintaining member disposed between the first and second substrates at the first region where the switching device is formed, and disposed over the overlapping boundaries of the two color filters, where the first cell gap maintaining member is different from the overlapping boundaries of the color filters; and
a second cell gap maintaining member disposed between the first and second substrates at the second region where the storage line is formed, the second cell gap maintaining member being spatially separated from the first substrate, wherein the second cell gap maintaining member is not formed by overlapping of the color filters.

2. The display panel of claim 1, wherein the plurality of color filters includes a first colored color filter, a second differently colored color filter and a third differently colored color filter, wherein boundaries of two of the first, second and third color filters are overlapped at the first region, and wherein a portion of a light blocking layer is interposed between a base substrate of the second substrate and the color filters overlapped at the first region.

3. The display device of claim 1, wherein the first and second cell gap maintaining members have substantially the same height, thereby the thickness difference between the second cell gap maintaining member and the pixel electrode is same as the thickness difference between the color filter layer of the first region and that of the second regions.

4. The display panel of claim 1, wherein the thickness of the color filter layer at the first region is thicker than that at the second region due only to overlapping at the first region by the lateral boundaries of only two adjacent color filters at the first region.

5. A method of manufacturing a display device, comprising:
forming a first substrate having a plurality of pixel regions, the first substrate including a switching device formed at a first region and a storage line formed at a second region;
forming a pixel electrode over the switching device and the storage line in the pixel regions;
forming a second substrate including a color filter layer having a plurality of color filters each operable to provide color filtration, wherein lateral boundaries of at least two adjacent ones of continuous and operable color filters overlap at the first region so that a thickness of the color filter layer due to the overlapping color filters is thicker than that at the second region;
forming a first cell gap maintaining member over boundaries of the overlapping two color filters to be disposed at the first region where the switching device is formed, where the first cell gap maintaining member is different from the overlapping color filters;
forming a second cell gap maintaining member to be disposed at the second region where the storage line is formed and to be spatially separated from the first substrate, wherein the forming of the second cell gap maintaining member does not include forming by overlapping of the color filters; and
assembling the first and second substrates.

6. The method of claim 5, wherein said forming of the second substrate includes:
forming a relatively thin layer of inorganic layer on a transparent substrate;
patterning the inorganic layer to form a light-blocking layer;
forming the color filter layer with a plurality of color filters including a first color filter, a second color filter and a third color filter such that two of the first, second and third color filters are overlapped at the first region and a portion of the light blocking layer is interposed between a base substrate of the second substrate and the color filters overlapped at the first region.

7. The method of claim 5, wherein said forming the first cell gap maintaining member and said forming the second cell gap maintaining member comprises:
forming a cell gap layer over the color filter layer; and
patterning the cell gap layer to form the first and second cell gap maintaining members.

8. The method of claim 7, wherein:
said forming the cell gap layer over the color filter layer comprises forming an organic layer over the color filter layer.

9. The method of claim 7, further comprising:
forming an over-coating layer on the color filter substrate; and
forming a common electrode on the over-coating layer;
wherein said forming the cell gap layer over the color filter layer comprises forming the cell gap layer over the common electrode.

10. The method of claim 9, wherein each of the over-coating layer and the common electrode has a substantially uniform thickness, thereby the height difference between the first region and the second region is maintained.

11. The method of claim 5, wherein the first and second cell gap maintaining members have substantially the same height, thereby the thickness difference between the second cell gap maintaining member and the pixel electrode is same as the thickness difference between the color filter layer of the first region and that of the second regions.

12. The method of claim 5 wherein said forming of the second substrate such that lateral boundaries of at least two adjacent ones of continuous and operable color filters overlap at the first region includes:

causing the thickness of the color filter layer at the first region to be thicker than that at the second region due only to overlapping at the first region by the lateral boundaries of only two adjacent color filters at the first region.

* * * * *